United States Patent
Hedaoo et al.

(10) Patent No.: US 7,903,680 B2
(45) Date of Patent: Mar. 8, 2011

(54) ADAPTIVE ALGORITHM FOR REDUCING CHANNEL ZAPPING TIME IN MULTICAST MEDIA

(75) Inventors: Atul Kisanrao Hedaoo, Bangalore (IN); Ravi Kumar Singh, Kundanhalli (IN); Rayesh Kashinath Raikar, Uttar Kannada District (IN); Vijaya Bhaskar Kommineni, Andrapradesh (IN)

(73) Assignee: Agere Systems Inc., Allentown, PA (US)

( * ) Notice: Subject to any disclaimer, the term of this patent is extended or adjusted under 35 U.S.C. 154(b) by 384 days.

(21) Appl. No.: 11/970,340

(22) Filed: Jan. 7, 2008

(65) Prior Publication Data
US 2009/0175272 A1    Jul. 9, 2009

(51) Int. Cl.
*H04L 12/28* (2006.01)

(52) U.S. Cl. .......................................... 370/431; 370/464

(58) Field of Classification Search .................. 370/401, 370/402, 395.52; 709/203, 223, 229; 725/46
See application file for complete search history.

(56) References Cited

U.S. PATENT DOCUMENTS

2008/0115168 A1*   5/2008   Adwankar et al. .............. 725/46

* cited by examiner

*Primary Examiner* — Brenda Pham
(74) *Attorney, Agent, or Firm* — Mendelsohn, Drucker & Associates, P.C.; Kevin M. Drucker; Steve Mendelsohn

(57) ABSTRACT

A method and system for reducing channel changing time in multicast media, that can include the steps of receiving at least one of a plurality of available channels from a service provider at a residential gateway through a network, ranking the popularity of at least one of the available channels at a ranking engine connected to the residential gateway, and requesting to receive a number of the channels available from the service provider at the residential gateway based on the ranking. The rank is at least partly based on the data stored in the database.

21 Claims, 4 Drawing Sheets

ACCESS NETWORK
104a

RESIDENTIAL NETWORK
104b

ADAPTIVE ALGORITHM FOR REDUCING CHANNEL ZAPPING TIME IN MULTICAST MEDIA

FIELD OF THE INVENTION

The invention relates to the transmission of media and more specifically to the transmission of media over a network.

BACKGROUND

Multimedia broadcasts have evolved from television and radio stations being transmitted in an analog signal over the air via antennas to being digitally multicast through the Internet. Internet Protocol Television ("IPTV"), a form of IP multicasting, enables the transmission of television content from a service provider through the Internet to a service subscriber. Upon reaching its destination, the television content is displayed on a user interface, such as a computer or television connected to a set-top box ("STB").

In multicast technology, a single copy of the packet traverses the data network, such as the Internet, until the last possible point where it may be replicated and still reach plural recipients. The packet is then replicated at that point. Accordingly, multicasting efficiently utilizes network infrastructures and enables a service provider to transmit packets comprising a media program only once, even if it needs to be delivered to a large number of receivers.

While multicasting media has advantages, it also has setbacks such as bandwidth limitations and delays associated with channel changes. Thus, an improved method of changing channels in a multicast media is desired.

SUMMARY OF THE INVENTION

In some embodiments a method for reducing channel changing time in multicast media may include the steps of receiving at least one of a plurality of available channels from a service provider at a residential gateway through a network; ranking the popularity of at least one of the available channels at a ranking engine connected to the residential gateway, wherein the rank is determined by a method; and requesting to receive a number of the channels available from the service provider at the residential gateway based on the ranking. The method for determining the rank includes the steps of receiving data from at least one node connected to the residential gateway; storing the data in a database; and determining the rank of the channels based upon the received data.

In embodiments a system may include a residential gateway configured to receive a plurality of channels from a service provider through a network and transmit the channels to a plurality of nodes. The residential gateway includes a database configured to store data received from the service provider and the plurality of nodes and a ranking engine connected to the database. The ranking engine is configured to rank the popularity of each of the plurality of channels available from the service provider based upon the data stored in the database.

DETAILED DESCRIPTION

Figure 1:
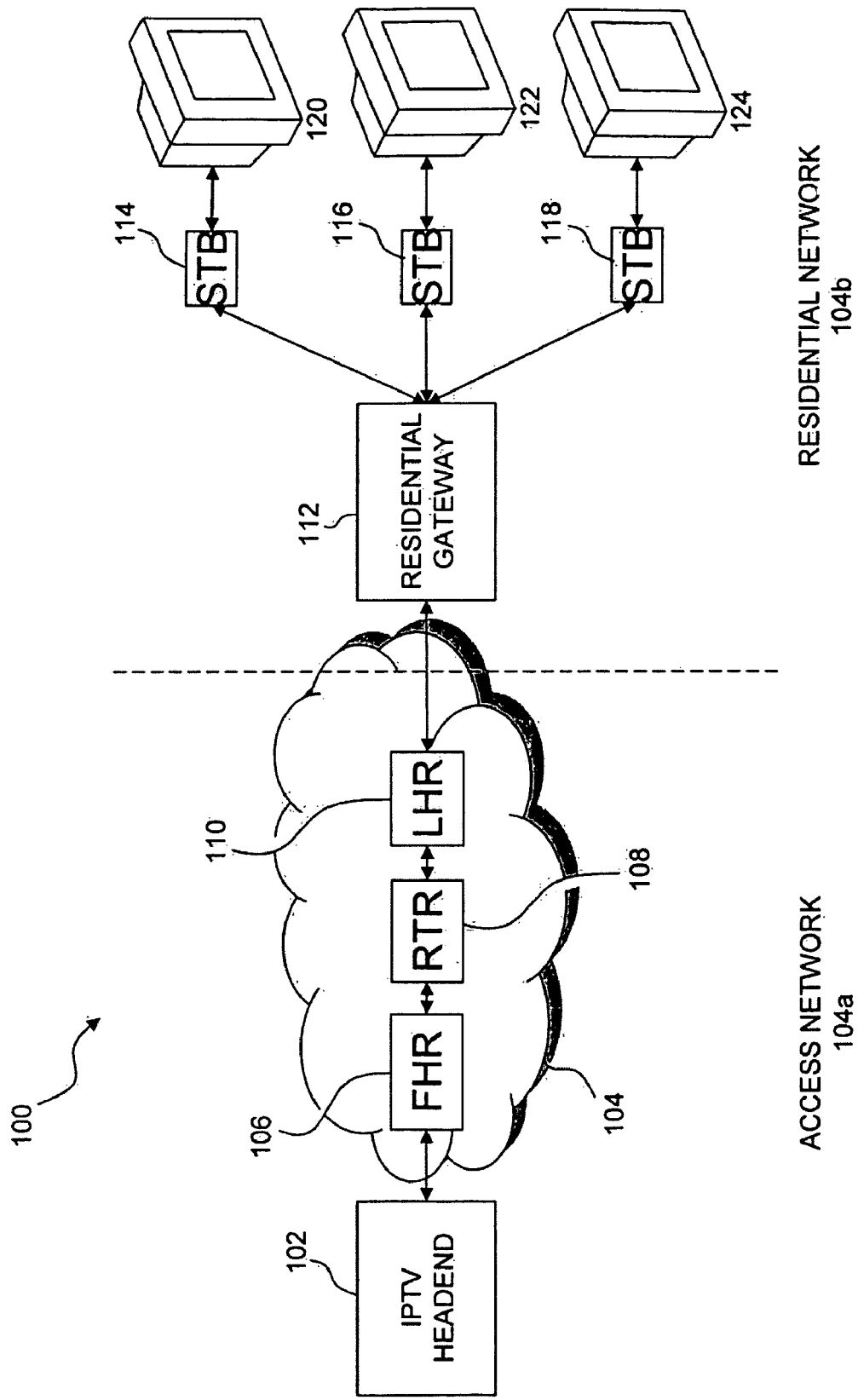
FIG. 1 illustrates a conventional IPTV network architecture.

FIG. 1 illustrates a conventional IPTV network architecture 100. IPTV network architecture includes network 104, such as the Internet, a first-hop router ("LHR") 106, a last-hop router ("LHR"), 110 and one or more multicast-aware routers 108. Network 104 may be thought of as having two parts: an access network 104a and a residential network 104b. The access network 104a includes the service provider 102 and each of the multicast-aware routers 106, 108, 110, which are capable of transmitting the media packets to a plurality of residential networks 104b as is explained below. IPTV headend 102, having multicast ability, resides at one edge of the access network 104a and is used by a service provider to route multiple media channels through network 104. As shown in FIG. 1, IPTV headend 102 is connected to FHR 106, which also has multicast ability. Streamed media traverses network 104 from IPTV headend 102 through multicast aware routers 108 until it reaches the residential network 104b.

The residential network 104b may include a residential gateway 112 connected to one or more user-interfaces, such as a set-top box ("STB") 114, 116, 118 connected to a television 120, 122, 124. Residential gateway 112 is connected to LHR 110 forming the interface between the access network 104a and the residential network 104b. Residential gateway 112 also has multicast ability and performs the role of a multicast host agent for the residential network 104b. Once the media content reaches residential gateway 112, the gateway directs the data to one or more STB 110, 112, 114 where the data is processed and displayed on a television 120, 122, 124 so it can be viewed by a user.

Media are typically sent across the Internet and received by a residential gateway 112 serving as a multicast host agent. The residential gateways typically use the Internet Group Management Protocol ("IGMP") to manage the membership of Internet Protocol groups among the multicast routers 106, 108, 110 with which the gateway 112 is connected. There are four IGMP messages of concern to the conventional residential gateway-LHR interaction during a channel-change operation, which are as follows: (1) an IGMP Join message; (2) IGMP Leave message; (3) Membership Query message; and (4) a Membership Report message. The IGMP Join message is used for joining a multicast group (e.g., a request to tune into a particular channel). The IGMP Leave message is used for leaving a multicast group (e.g., a request to change the channel). A Membership Report message is used to determine whether a particular group, such as one or more STBs 114, 116, 118 in the residential network 104b, is tuned into a particular channel. The Membership Report message is used by STBs 114, 116, 118 to report their multicast group memberships.

Figure 2:
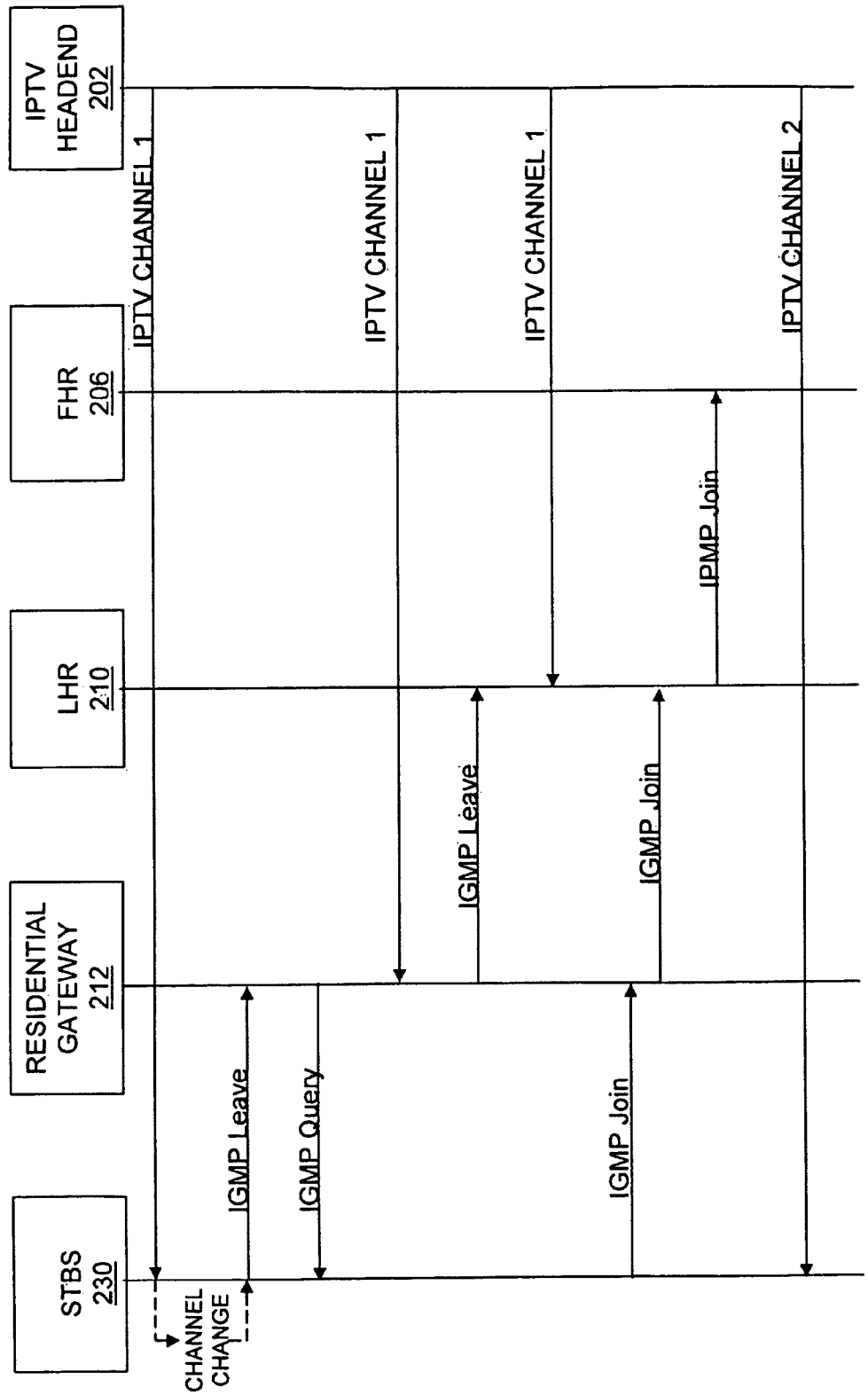
FIG. 2 illustrates a conventional channel changing scenario in an IPTV network.

With reference to FIG. 2, a conventional method of changing an IPTV channel is now described. Note that items in FIG. 2 are labeled with reference numerals having the same two least significant digits as corresponding structure in FIG. 1, increased by 100. Also note that reference numeral 230 refers to a plurality of STBs, such as STBs 114, 116 and 118 in FIG. 1, connected to residential gateway 212 in the residential network 104b. Assume, for example, a user watching television is tuned into channel 1 on one of the STBs 230. If the user wants to change the channel from channel 1 to channel 2, the user signals the STB to change the channel by pushing a button on the STB or on the remote control of the STB. Once the signal from the user interface instructing the STB to change the channel is received at the STB, the STB generates an IGMP Leave message for channel 1. The IGMP Leave message is then transmitted to residential gateway 212. Upon receiving the IGMP Leave message, residential gateway 212 generates an IGMP Query message to query the STBs 230 in the residential network 104b to determine if any of the STBs 230 is currently viewing that channel. The IGMP Query message typically includes a time value so that if a Membership Report is not received by residential gateway 212 within the specified time interval, residential gateway 212 will assume that there are no STBs in the group and forwards the IGMP Leave message to LHR 210.

After LHR 210 receives the IGMP Leave message, it stops routing channel 1 to residential gateway 212. Residential gateway 212 then forwards the IGMP Join message it receives from the STB for joining channel 2 to LHR 210. LHR 210 then sends a join message to the other multicast routers in the access network 104a so the multicast stream for the group corresponding to channel 2 can be transmitted through the several routers to residential gateway 212 and ultimately to the STB requesting to see channel 2.

This conventional method of channel changing can experience delays as the signal is routed across the access network 104a to the STB requesting the channel in a residential network 104b. Additionally, the conventional method of channel changing can result in an increase in network traffic as messages are sent from a STB across the network to the FHR, which in turn attempts to locate other multicast routers in the access network 104a subscribing to a particular channel and have the channel routed to the STB.

Figure 3:
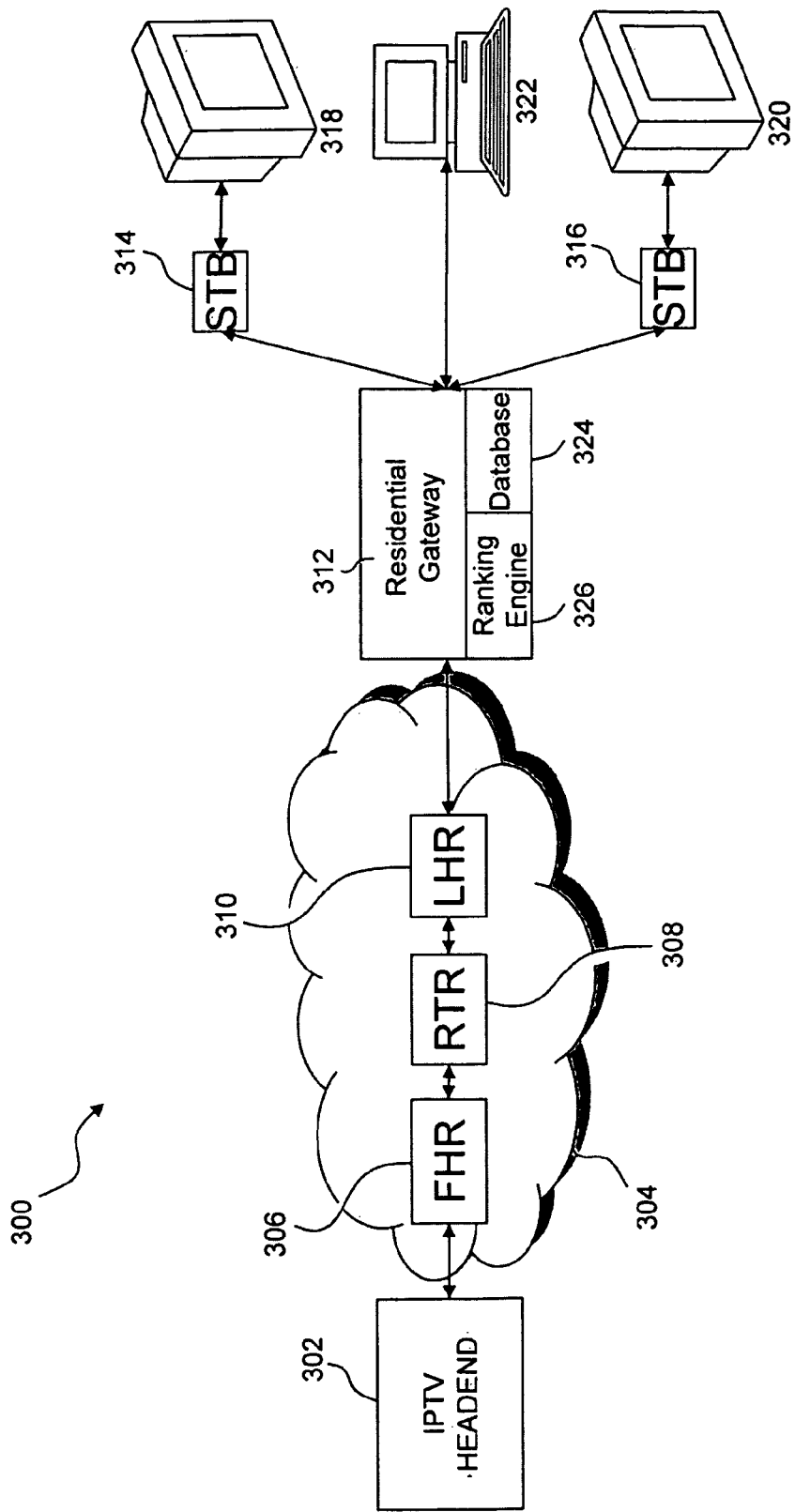
FIG. 3 illustrates an exemplary embodiment of a multicast media network architecture.

FIG. 3 illustrates an exemplary embodiment of a multicast media network 300. Multicast media network 300 includes a network headend 302 connected to FHR 306. Network headend 302 may be configured with multicast capability. In an exemplary embodiment, network headend 302 is connected to network 304, which is the Internet, but other systems using a method as described herein may use different networks, preferably also using Internet Protocol (IP). Network headend 302 is used by a service provider to compress and transmit media across network 304 to a plurality of residential gateways 312 each connected to a residential network 104b. The media may be compressed using a variety of compression techniques including, but not limited to, MPEG-2, MPEG-4 and VC-1. The media is typically transmitted from network headend 302 to residential gateway 312 by traversing network 304 through a plurality of multicast aware routers 308 in addition to FHR 306 and LHR 310. The compressed media may be transmitted in a MPEG transport stream using IP protocols, such as, for example, Real-Time Streaming Protocol ("RTSP") or Real-Time Transport Protocol ("RTP").

In an exemplary embodiment, residential gateway 312 is configured to be a multicast host agent that multicasts signals to a plurality of nodes 314, 316, 322 connected to residential gateway 312. As shown in FIG. 3, a node may be an STB 314, 316, a computer 322 or any other device configured to receive and process the transmitted media signal. Residential gateway 312 may be connected to computer 322 or STBs 314, 316 in any number of ways including a wireless connection or a wired connection using a Category 6 network cable, coaxial cable, or the like. When the compressed media packets arrive at computer 322 or STBs 314, 316, it is decompressed using the same codec (e.g., MPEG-2 or MPEG-4) used to compress the data before it was transmitted from IP headend 302. STBs 314 and 316 are also connected to televisions 318 and 320 so that the media, such as a television show, may be presented to a user.

As shown in the exemplary embodiment illustrated in FIG. 3, residential gateway 312 includes a database 324 and ranking engine 326. Note that ranking engine 326 and database 324 may reside in a separate module communicatively connected to residential gateway 312. Database 324 may be any data storage device that may transmit and receive data electronically. Data from the residential network nodes 314, 316, 322 is transmitted to residential gateway 312 where it is stored in database 324. The received data describes the channel viewing characteristics of each node. For example, the data may include information regarding the duration a node 314, 316, 322 remains tuned into particular channel, what time a channel is requested, and how many times a channel is requested. Note that other data concerning the channels requested and received by nodes 314, 316, 322 may be received at residential gateway 312 and stored in database 324.

In an exemplary embodiment, ranking engine 326 is configured to periodically rank the popularity (among residential nodes 314, 316, 322) of the media channels available from a service provider through network 304. Alternatively, ranking engine 326 may be configured to rank channels at the request of a user or upon receiving a command from a management device connected to network 304. The channel rankings are determined at ranking engine 326 by inputting the data received from the nodes 314, 316, 322 into a plurality of algorithms as described in greater detail below. Ranking engine 326 may be configured to rank the channels according to their overall popularity in the residential network or according to their popularity at each of the nodes 314, 316, 322. Put another way, ranking engine 326 may create a single ranking for the residential gateway 312 or a number of rankings that is equal to the number of nodes 314, 316, 322 connected to residential gateway 312.

Figure 4:
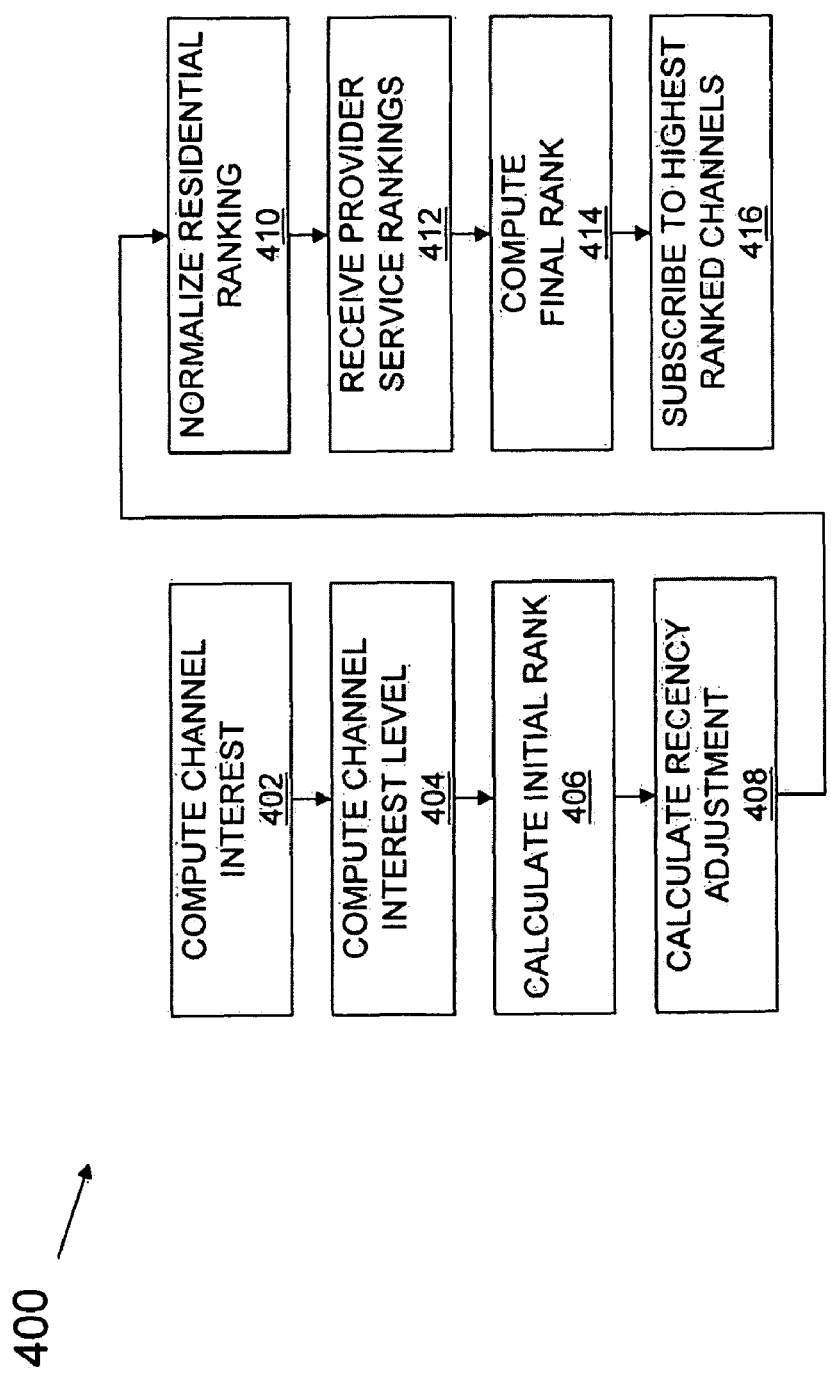
FIG. 4 is a block diagram of an exemplary method for reducing the channel changing time in accordance with the embodiment illustrated in FIG. 3.

FIG. 4 is a block diagram of an exemplary method 400 for reducing the average channel-changing time in multicast media in accordance with the exemplary embodiment illustrated in FIG. 3. Method 400 includes the steps of computing the interest in a channel 402; computing the interest level in a channel 404 (note that "interest" and "interest level" are two different measures, described below); calculating a recency adjustment 406; receiving a provider rating adjustment 408; normalizing the residential gateway rank 410; calculating a final rank 412; and subscribing to a predetermined number of available channels 414 based upon the final rank.

In an exemplary embodiment, at step 402, the interest in a channel is determined by calculating the duration a channel is viewed in the residential network based on the received data stored in database 324. Since the duration a user may remain on a particular channel may significantly vary, the interest value is averaged, as described below, to acquire a more accurate representation of the actual interest in the channel. For example, a person "channel surfing" (e.g., aimlessly flipping through multiple channels) will repeatedly change the channel on a STB 314, 316 or computer 322 and remain on a channel for only a short period of time. However, if a user is watching a show, then it is likely that STBs 314, 316 or computer 322 will remain on the same channel for a longer period of time. Equation (1) below may be used to approximate the interest value of a plurality of channels and may implemented in ranking engine 326 of residential gateway 312.

$$\text{Interest}(d_m, n, i) = \quad (1)$$
$$(1-\alpha) \times \text{Interest}(d_{(m-1)}, n, i) + \alpha \times \text{duration}(d_{(m-1)}, n, i)$$

-continued

Where, $$\text{duration}(d_m, n, i) = \frac{\sum_{i=1}^{NumberofNodes} ViewingTimeofNode}{NumberofNodes}$$

The Interest ($d_m$,n,i) value is a moving average for the channel 'i' viewed, during the 'n'$^{th}$ time slot on day $d_m$. The duration ($d_{(m-1)}$,n,i) is the average time a node 314, 316, 322 spends viewing the channel on the day $d_{(m-1)}$ in the 'n'$^{th}$ time slot and may be determined based upon the information received from each of the nodes 314, 316, 322 and stored in database 324. The term α is a moving average filter constant that ranges between zero and one. The larger the value of α used, the greater the weight given to the most recent day's viewing data.

At step 404, the interest level in a channel is determined. The interest level is a separate value from the interest and is based upon how many times a channel on a node 314, 316, 322 is requested and viewed. Note the interest level does not take into account how long a channel is viewed. The interest level of a channel may be calculated by ranking engine 326 by implementing Equation (2) in ranking engine 326:

$$\text{InterestLevel}(d_m, i) = \frac{1 + NumberofBrowsing(d_m, i)}{\sum_{i=1}^{n} NumberofBrowsing(d_m, i)} \quad (2)$$

The InterestLevel($d_m$,i) is an approximation of a node-interest level for 'i' channel, during a day $d_m$. NumberofBrowsing($d_m$,i) represents the number of times channel 'i' is browsed during day $d_m$ and may be obtained based upon the data received from nodes 314, 316, 322.

Once the interest and interest level of a channel have been approximated by Equations (1) and (2), an initial channel rank, Irank($d_m$,n,i), is determined at block 406. The initial rank is an approximation of the popularity of channels based on how frequently a channel is requested by a node 314, 316, 322 and how long the channel is viewed. The initial rank is approximated by taking a weighted sum of the interest and interest level in accordance with Equation (3), below:

$$\text{Irank}(d_m,n,i) = w1 \times \text{Interest}(d_m,n,i) + (100-w1) \times \text{InterestLevel}(d_m,i) \quad (3)$$

Step 408 of method 400 includes calculating a recency adjustment. The recency adjustment gives more weight to channels that have been more recently viewed. Note that the recency adjustment may be calculated before, after, or simultaneously with the calculation of the initial rank depending on the computing power of ranking engine 326. Calculating the recency adjustment helps residential gateway 312 request channels that are likely to be requested by a user before they are actually requested by a user. For exemplary purposes, assume a first user is watching a channel on television 318 connected to STB 314. Next, the first user stops watching the television, and sometime thereafter, a second user, having a different taste in programming, starts watching the same television 318 through STB 314. Since the first user and the second user have different tastes in programming, the channel or channels viewed, for example, two hours ago by the first user are less indicative of the next channel that is likely to be viewed than the channel viewed 2 minutes ago by the second user. In an exemplary embodiment, the recency adjustment may be approximated by Equation (4), below:

recencyAdjustment($d_m$,n,i)=$f(d_m,n,i)$

Where, $f(d_m,n,i) = e^{-d_m}/\lambda$ (4)

The recency adjustment is computed and weighted on the basis of how much time has elapsed since a channel has been last viewed. Typically, a negative exponential function with a mean life time of λ is used.

After the initial rank and the recency adjustment values have been determined, the rank of a channel is normalized at step 410. The normalization helps to more accurately rank the popularity of a channel and may be approximated by Equation (5), below:

$$\text{Nrank}(d_m,n,i) = \text{recencyAdjustment}(d_m,n,i) \times \text{Irank}(d_m,n,i) \quad (5)$$

At step 412, the service provider ranking is received at residential gateway 312. The channel rankings provided by the service provider may be hourly, half-hourly or daily rankings. For example, a service provider may provide that CNN is its most viewed channel from 8 am to 9 am and that CNBC is its most popular channel from 9 am to 10 am. The service provider rankings may be transmitted to residential gateway 312 at set intervals, for example, every day, week or month. Additionally, the service provider rankings may be stored in database 324.

At step 414 of method 400, the final rank, Frank, for a channel 'i' is determined. In an exemplary embodiment, the final rank may be computed as a weighted average of the service provider rank, SPrank($d_m$,n,i), received in step 408, and the normalized rank calculated in step 410. The weighted average, $w_{serviceprovider}$, ranges from 0-100 and in a preferred embodiment is determined by the manufacturer of each of the STBs 314 and 316. However, in other embodiments the weighted average may be a configurable parameter determined by a user and configured in either each of the residential network nodes 314, 316, 322 or in the ranking engine 326. The final rank value is determined by using Equation (6), below:

$$\text{Frank}(d_m,n,i) = w_{serviceprovider} \times \text{SPrank}(d_m,n,i) + (100 - w_{serviceprovider}) \times \text{Nrank}(d_m,n,i) \quad (6)$$

Once the final rank of the channels has been determined, the channels are sorted in accordance with their final rank. After being sorted, a certain number of the most popular available channels are requested to be received by residential gateway 312 at step 416. The channels are requested to be received by residential gateway 312 without waiting to receive a signal from an STB or the STB remote control requesting the specific channels. These channels are requested by residential gateway 312 even though a node 314, 316, 322 connected to residential gateway 312 may not be currently tuned into any of the channels. In an exemplary embodiment, residential gateway 312 is configured to request a predetermined number of the most popular channels available at residential gateway 312 from the service provider. For example, in the final rank of the channels, channel 10 is the most popular followed in descending order of popularity by channels 20, 30 and 40. If residential gateway is configured to request, for example, the four most popular channels, then residential gateway 312 would request channels 10, 20, 30 and 40 from the service provider even though none of these channels is currently being viewed in the residential network.

In another exemplary embodiment, residential gateway 312 is configured to request a predetermined number of the most popular channels for each of the nodes 314, 316, 322 connected to residential gateway 312. For example, assume the most popular channel in the residential network is channel 10 followed in descending popularity by channels 11 through 16. If residential gateway is configured to request the two most popular channels for each of the nodes in the residential network, then residential gateway 312 will not necessarily subscribe to channels 10 through 15, but instead may request channels 10 though 14 and channel 16. Residential gateway 312 may request these channels if, for example, the most popular channels at STB 314 are channels 10 and 11; the most popular channels at STB 316 are 12 and 13; and the most popular channels at computer 322 are channels 14 and 16.

Alternatively, residential gateway 312 may be configured to simply request as many of the most popular channels as possible. In this configuration, the number of channels residential gateway 312 requests to receive from the service provider varies in accordance with the amount of bandwidth available between LHR 310 and residential gateway 312. This configuration requires residential gateway 312 to determine the amount of bandwidth available between itself and the LHR 310 as well as the amount of bandwidth required to receive each of the channels. The number of channels to be requested, 'n', by residential gateway 312 is maximized as the quotient approaches '1' in the below condition:

$$\frac{\sum_{i}^{n}(ChannelBandwidth)_i}{LinkCapacity} \leq 1$$

Note that in any of the embodiments described above, satisfaction of the above condition helps to maintain optimal performance of the system as the network bandwidth will not be exceeded by requesting too many channels in advance of a request from a node.

By requesting several of the most popular channels in advance, the average channel changing time to these most popular channels is reduced since the residential gateway 312 does not need to contact the FHR 306 each time one of the most popular channels is requested by a node 314, 316, 322. Instead, the residential gateway 312 may immediately route the channel to the node 314, 316, 322 that requested to view the channel since the channel has already been requested by and received at residential gateway 312.

In addition to the above described embodiments, the present invention may be embodied in the form of computer-implemented processes and apparatus for practicing those processes. The present invention may also be embodied in the form of computer program code embodied in tangible media, such as floppy diskettes, read only memories (ROMs), CD-ROMs, DVD-ROMs, hard drives, "ZIP™" high density disk drives, flash memory drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A network device-implemented method for reducing channel-changing time in multicast media, comprising the steps of:
   the network device receiving data from at least one node, the data describing a channel viewing characteristic of the at least one node;
   the network device storing the received data in a database;
   the network device determining a rank of at least one of a plurality of channels available from a service provider, wherein the rank is at least partly based on the data stored in the database;
   the network device requesting to receive a subset of the channels available from the service provider based on the rank; and
   the network device receiving the requested subset of the channels.

2. The network device-implemented method of claim 1, wherein the requesting step is performed without waiting for a signal from the at least one node requesting transmission of the channels to the at least one node.

3. The network device-implemented method of claim 1, wherein the subset of requested channels is received at a gateway.

4. The network device-implemented method of claim 1, further including the step of:
   the network device receiving data from the service provider, wherein the data includes a service provider ranking for at least one channel.

5. The network device-implemented method of claim 1, wherein the step of requesting to receive a subset of channels includes the step of:
   the network device identifying the number of channels to request by determining an amount of available bandwidth available between a gateway and a last-hop router on the network.

6. The network device-implemented method of claim 4, wherein the subset of received channels has a total bandwidth that is less than the amount of bandwidth available between the gateway and the last-hop router.

7. The network device-implemented method of claim 1, wherein the at least one node is a set-top box.

8. The network device-implemented method of claim 1, wherein the at least one node is a computer.

9. A non-transitory computer-readable storage medium encoded with program code, wherein when the program code is executed by a processor, the processor performs a communications method comprising the steps of:
   receiving data from at least one node, the data describing a channel viewing characteristic of the at least one node;
   storing the received data in a database;
   determining a rank of at least one of a plurality of channels available from a service provider, wherein the rank is partly based on the data stored in the database;
   requesting to receive a subset of the channels available from the service provider based on the rank; and
   receiving the requested subset of the channels.

10. The non-transitory computer-readable storage medium of claim 9, wherein the subset of requested channels is received at a gateway.

11. The non-transitory computer-readable storage medium of claim 9, wherein the step of requesting to receive a subset of channels includes the step of:

identifying the number of channels to request by determining an amount of bandwidth available between a gateway and a last-hop router on the network.

12. The non-transitory computer-readable storage medium of claim 11, wherein the subset of received channels has a total bandwidth that is less than the amount of bandwidth available between the gateway and the last-hop router.

13. The non-transitory computer-readable storage medium of claim 9, further including the step of:
receiving data from the service provider including the service provider rank for at least one channel.

14. The non-transitory computer-readable storage medium of claim 9, wherein the at least one node is a set-top box.

15. The non-transitory computer-readable storage medium of claim 9, wherein the at least one node is a computer.

16. A network device comprising:
an interface configured to receive a plurality of channels from a service provider;
an interface configured to transmit the plurality of channels to a plurality of nodes;
a database configured to store data received from at least one node, the data describing a channel viewing characteristic of the at least one node; and
a ranking engine connected to the database, the ranking engine configured to rank at least one of the plurality of channels available from the service provider based at least partly upon the data stored in the database,
wherein the network device is configured to (i) request to receive a subset of the channels available from the service provider based on the rank, and (ii) receive the requested subset of the channels.

17. The network device of claim 16, wherein the network device is capable of receiving the plurality of channels through the Internet.

18. The network device of claim 16, wherein one of the plurality of nodes is a set-top box.

19. The network device of claim 16, wherein one of the plurality of nodes is a computer.

20. The network device of claim 16, wherein the network device transmits the channels using one of the group consisting of real-time transport protocol (RTP) and Real Time Streaming Protocol (RSTP).

21. The network device of claim 16, wherein the network device is configured to receive data from the service provider including a service provider ranking for at least one channel.

* * * * *